TIME SEQUENTIAL CATHODE CONNECTIONS OF COMMON-ANODE LUMINOUS SCREEN FOR CHANGING PATTERNS

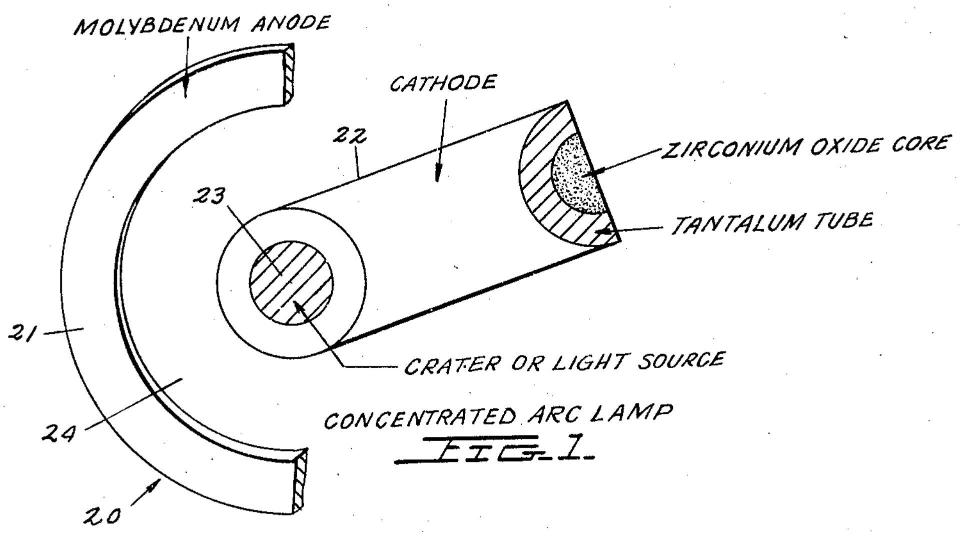
CONCENTRATED ARC LAMP
FIG. 1
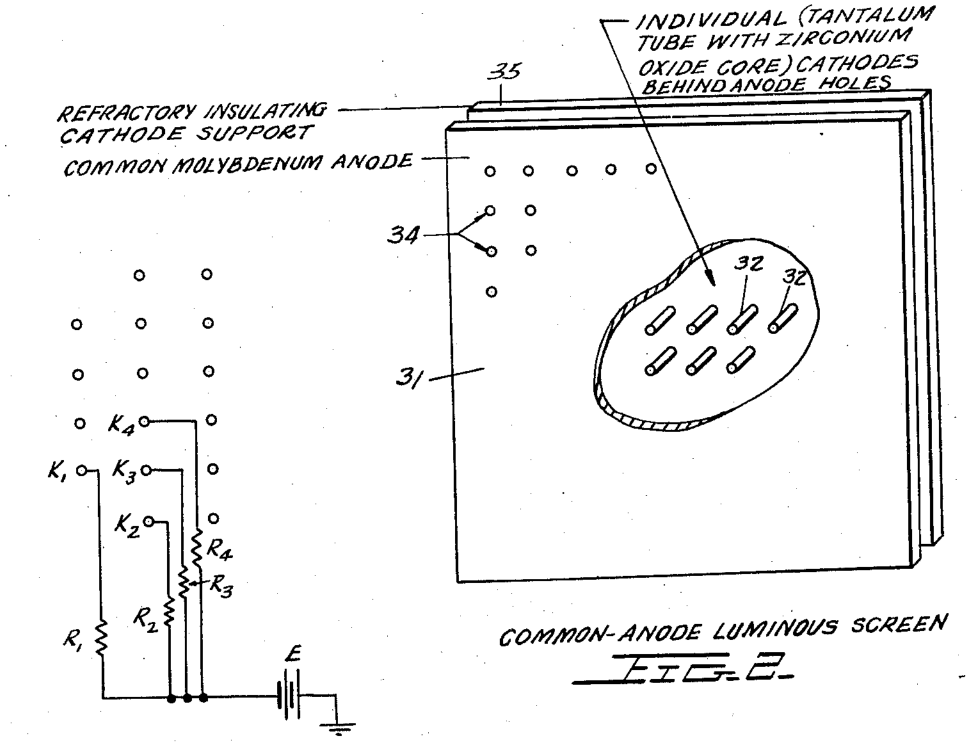
COMMON-ANODE LUMINOUS SCREEN
FIG. 2
TIME INDEPENDENT CATHODE CONNECTIONS OF COMMON-ANODE LUMINOUS SCREEN FOR STATIONARY PATTERNS
FIG. 3
INVENTOR.
ALBERT SHADOWITZ
BY Ostrolenk & Faber
ATTORNEYS TIME SEQUENTIAL CATHODE CONNECTIONS OF COMMON-ANODE LUMINOUS SCREEN FOR STATIONARY PATTERNS.

BEHAVIOR OF VOLTAGE AND LIGHT OUTPUT WITH TIME OF CONCENTRATED ARC

INVENTOR.
ALBERT SHADOWITZ
BY
Ostrolenk & Faber
ATTORNEYS

COMMON CATHODE LUMINOUS SCREEN

SQUARE MATRIX SCREEN

INVENTOR.
ALBERT SHADOWITZ

BY

Ostrolenk & Faber

ATTORNEYS

EXTERNAL ELECTRODE CONNECTIONS OF SQUARE LUMINOUS SCREEN FOR CHANGING PATTERNS

COMPARISON OF SQUARE MATRIX CONTROL AND CUBE MATRIX CONTROL ARRANGEMEN.

INVENTOR.
ALBERT SHADOWITZ

BY
Ostrolenk & Faber
ATTORNEYS

CONNECTIONS FOR CONTROL OF A SQUARE ARRAY OF 64 POINTS WITH 3 COMMUTATORS

THREE ELECTRODE CONCENTRATED ARC FIELD EMISSION STARTER

THREE ELECTRODE CONCENTRATED ARC GLOW DISCHARGE STARTER

INVENTOR.
ALBERT SHADOWITZ
BY
Ostrolenk & Faber
ATTORNEYS

FERRITE TOROID

HYSTERESIS CURVE

POSITION FERRITE COMMUTATOR

CUBE MATRIX TELEVISION RECEIVING SYSTEM PARTIAL BLOCK DIAGRAM

INVENTOR.
ALBERT SHADOWITZ

BY Ostrolenk & Faber

ATTORNEYS

SUPER MATRIX TELEVISION RECEIVING SYSTEM BLOCK DIAGRAM

EIGHT POSITION DIODE COMMUTATOR

INVENTOR.
ALBERT SHADOWITZ
BY
Ostrolenk & Faber
ATTORNEYS

United States Patent Office 2,858,480
Patented Oct. 28, 1958

2,858,480

SELF-LUMINOUS SCREEN, TELEVISION RECEIVING SYSTEM AND DISPLAY SYSTEM

Albert Shadowitz, Nutley, N. J.

Application May 2, 1955, Serial No. 505,152
12 Claims. (Cl. 315—168)

My invention release to a self-luminous screen for the display of patterns, pictures or information and is more particularly applicable to a television receiving system utilizing such a screen, as well as to a display system using such a screen for purposes other than for television. The screen is of the type consisting of a large collection of very small but very bright light sources each of which is independently controllable in intensity with great rapidity. Both the television receiving system and the display system relate to suitable methods for utilizing such a screen for the desired ends.

It is a primary object of my invention to provide a self-luminous screen (1) that is capable of brightness of the same order of magnitude as that obtained on a motion picture screen; (2) that is able to provide pictures with a definition comparable to that obtained on a cathode ray oscilloscope tube; (3) in which it is possible to change the designs or patterns on the screen with the rapidity demanded by standard television signals; (4) which can provide pictures as large as those of the usual motion picture theatres if necessary; (5) which can provide pictures either in full natural color, with no color registration problems or running of the colors, or in black and white, as desired; and (6) that is simple to construct.

It is a further object of my invention to incorporate such a screen and the necessary control circuits into a combination which would constitute a television receiving system of unique performance. In the home, large bright television pictures could be obtained on the wall of the room, the image being as large as that used for home movies and with comparable quality. Primarily, however, because of price considerations, the system would be intended for theatre television.

It is a further object of this system to be able to reproduce modern, compatible color television programs in either natural color or in black and white and to do so in a superior manner, not subject to the difficulties of color running and registration that are characteristic of the present methods using color cathode ray tubes.

Finally, it is an object of this invention to combine such a screen with such auxiliary equipment as would allow it to be used for the display, to large audiences, of many different kinds of printed and pictorial matter such as oscilloscope patterns, radar designs, still and animated advertising displays, motion pictures and other complex visual data.

The foregoing and many other objects of the invention will become apparent in the following description and drawings in which:

Figure 1 is a schematic view of a concentrated arc lamp used in my invention.

Figure 2 is a schematic perspective view, partially in section, of a common-anode luminous screen.

Figure 3 is a schematic circuit diagram of the time independent cathode connections of a common-anode luminous screen for stationary patterns.

Figure 4:
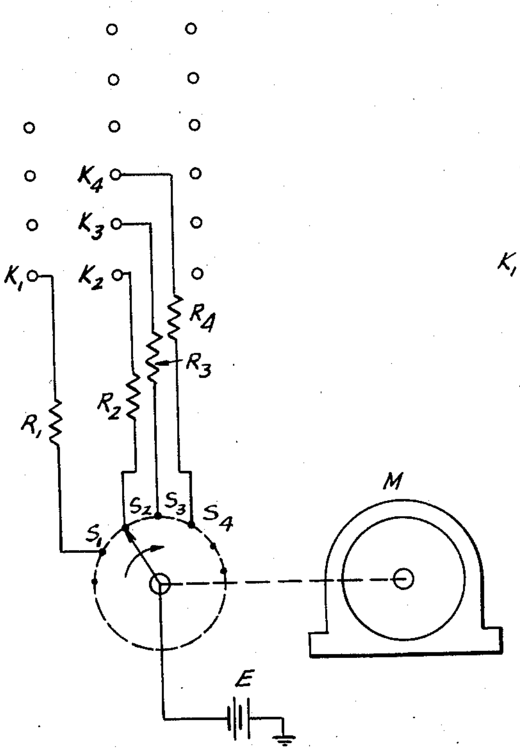
Figure 4 is a schematic circuit diagram of the time sequential cathode connections of a common-anode luminous screen for stationary patterns.

To understand the nature of the self-luminous screen it is well to consider first the concentrated arc discharge device shown in U. S. Patent No. 2,453,118. This differs from the usual carbon arc in that it has permanent fixed electrodes which are sealed into a glass bulb filled with an inert gas at approximately atmospheric pressure. The name "concentrated arc" comes from a characteristic of the lamp which makes it possible to concentrate the arc activity upon a small portion of the electrodes so as to produce a very high intensity light source in the form of a very small luminous circular spot which is fixed in position, sharply defined and uniformly brilliant.

Figure 1 shows the construction of a concentrated arc lamp 20. The two electrodes 21 and 22 are mounted in a bulb (not shown) so that the exposed oxide surface 23 of the cathode 22 is but a few hundredths of an inch from and directly behind a hole 24 in the anode 21. This hole is slightly larger in diameter than the cathode tube and serves as a window for the emergence of light from the cathode. The bulb is filled with argon to almost atmospheric pressure. Depending on the construction, the spot diameter can be as small as 0.01 mm. or as large as 1/16 inch. The cathode 22 is a tantalum tube with a zirconium oxide core 23 and the anode is molybdenum.

It is known (see Patent No. 2,453,118) that it is possible to maintain an arc from a point on a metallic cathode with a much greater current density at the surface of the cathode than has heretofore been obtainable, either with a thermionic arc or with a cold cathode arc of types heretofore known. The cathode end of the arc is restricted in cross-section and impinges only upon a small area of the cathode surface and results in a current density which will give a luminosity of an extremely high order, for example, of the order of 50,000 candle power per square centimeter of cathode surface, although the usual commercial forms of the lamps produce approximately 10,000 candle power per square centimeter.

Moreover, there is provided a sharply defined "point" light source since the concentration of the arc is maintained upon a minute area of the cathode and forms an intensely concentrated light spot on or adjacent to the cathode, and there is little or no tendency for the "point" light source to wander over the surface of the cathode so that there is no variation or change in the configuration or position of the arc thus formed.

The intensity of the "point" light source formed at the cathode is proportional to the power traversing the arc, and the light radiated may be rapidly varied or modulated in intensity in accordance with variations in the power traversing the arc, and thus the arc may be modulated at high frequencies.

Having briefly considered the nature of the known concentrated arc discharge device I turn now to the manner in which it is related to the luminous screen of the instant invention. This screen will be shown here in three separate and distinct versions all based on the same principle. It will be understood from the explanations herein given that other versions of the screen will all utilize the principles of the screens herein disclosed.

Figure 2 shows the common-anode version of the luminous screen. It will be appreciated that the diagram is drawn in such a way as to show its development from a mere collection of the concentrated arc lamps of Figure 1 and is not meant to indicate the actual manner of construction. In this figure it will be seen that one molybdenum plate 31 serves as the common anode for a large number of separate and distinct individual cathodes 32, 32 (also hereinafter referred to as K). These cathodes are all similar to each other and to the cathode 22 of Figure 1. They are all supported in positions directly behind corresponding holes 34 in the anode plate 31. These holes may be arranged in rows and columns; or they may fall at the intersections of radii and circles of various diameter; or they may be spaced along a spiral curve; or they may be arranged in any other manner. Whatever this fashion is, the individual cathodes 32 are arrayed directly behind the holes 34 in identical fashion.

The cathode supporting plate 35 is of refractory material and rigidly mounted behind the anode 31 and is spaced the correct amount by means not shown but apparent to anyone skilled in the mechanical arts. The entire structure is contained in a sealed off chamber containing argon at atmospheric pressure, the front of the chamber being made of glass or some other suitable transparent body such as a plastic. The rear of the chamber may be the refractory insulating cathode support 35 itself, with the individual cathode tubes 32 projecting to the rear through leak-proof holes in the support 35, thereby providing the electrical connections to the cathodes 32; or the rear of the chamber may be a completely separate gas-tight insulator with provision for taking out the many cathode electrical leads. The four sides of the chamber may be of any material which is strong enough, either conducting or insulating. An electrical lead to the anode 31 is brought out separately.

It will be appreciated that the entire structure may be made quite thin, ½ inch e. g., while the lateral dimensions may be measured in feet. Since the gas pressure inside the structure is the same as the air pressure outside it, there are no undue large stresses on the glass.

The pattern exhibited on the face of the screen will now depend on which cathodes, in addition to the anode, are energized and to what extent. Each cathode may be permanently connected through a suitable resistor to a common electrical source. In this way, if there are sufficient individual connectors and arcs to give suitable definition, any stationary pattern may be formed by choosing the proper resistor for each little pin point of light. For high definition, of course, the current requirements will be quite high, each arc taking of the order of 50 milliamperes at full brightness for the smallest sized cathode design. The voltage requirement is such, however, that the power required for the light output is low; the efficiency is high compared to conventional lamps.

Figure 3 illustrates how, if the anode is at ground potential, cathode $K_1$ is connected to the power supply E by resistor $R_1$, cathode $K_2$ is connected to the power supply by resistor $R_2$, etc.

As indicated in the patent referred to above, for starting purposes it is necessary to apply a momentary high voltage. An auxiliary filament for ionizing the gas, thereby permitting starting without the momentary high voltage, has been used successfully on an alternating current version of the concentrated arc lamp. The auxiliary filament may work in a direct current device but will necessarily work in an alternating or pulsating current device.

Instead of connecting all the small, numerous concentrated arcs permanently and simultaneously to the power source, an external commutator may be used to connect each of the concentrated arcs in succession, one at a time, to the power source. In this way, starting at one point and proceeding in any predetermined manner until all the points are covered, a stationary image may again be formed. If this process is repeated rapidly enough such that e. g., the entire screen is scanned approximately 15 times a second or faster, then there will be no apparent flicker to the human eye. Figure 4 illustrates how, if the anode is at ground potential, cathode $K_1$ is connected to the power supply E via segment $S_1$ of commutator C turned by motor M. Likewise, cathode $K_2$ is connected via $S_2$, etc.

The use of a commutator adds to the cost. It also requires care that its speed be neither too slow, as pointed out above, nor too fast. Suppose, for example, that the commutator connects a given concentrated arc to the power supply for a time $t$ sec. which is small compared to the time T sec. for completing one whole cycle. If the light were emitted only during the interval $t$ and it was of constant brilliance B, then the average brilliance for that point over one complete cycle would be $$\frac{t}{T}B:$$

the brilliance is much reduced. However, it turns out that the time interval during which light is emitted is not the same as the time interval during which the arc is energized. The comparatively long time of de-ionization of the arc causes appreciable light to be emitted for approximately 20 milliseconds after the voltage has been removed.

Figure 5:
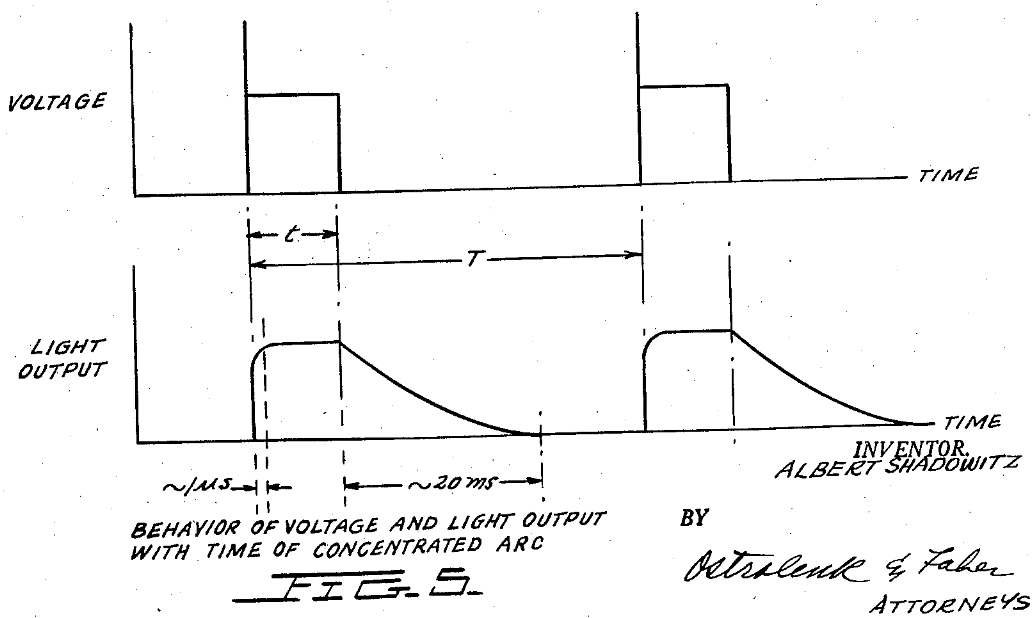
Figure 5 is a graph of the behavior with time of the voltage and light output of a concentrated arc.

Figure 5 shows two graphs which compare the behavior of the voltage with that of the light output. The net effect is that the average light output is raised, if T is not too much greater than 20 ms., to approximately ¼B. If T becomes smaller and smaller, the average brilliance increases but the new arc is turned on when the old arc has not yet been extinguished. While this is of no importance for stationary patterns, it is very important if the patterns are changing with time as it limits the rapidity with which the motion may be faithfully reproduced.

Figure 6:
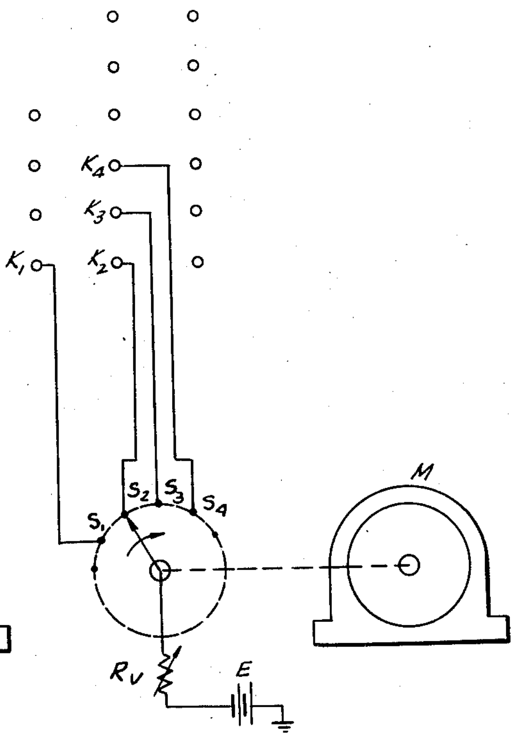
Figure 6 is a schematic circuit diagram of the time sequential cathode connections of a common-anode luminous screen for changing patterns.

Despite these drawbacks, the commutator is very important because it permits the luminous screen to display changing patterns as well as stationary patterns. While the time independent system of Figure 3 is, in principle, capable of displaying changing patterns if each of the fixed resistors is replaced by a separate variable resistor, in actual practice this would entail so much equipment, labor and cost as to render such a device impractical. The time sequential system of Figure 4, however, may be modified quite simply to make it capable of displaying changing patterns. In Figure 6 one variable resistance $R_v$ has its value adjusted at each commutator segment S by means not shown. The savings in using only one variable resistor or modulator $R_v$ is apparent.

Closely related to the common-anode version of the luminous screen is a variant which follows essentially the same structure and principle. This is the common-cathode screen shown in Figure 7. Everything noted above for the common-anode version holds with only slight modification for the common-cathode version. The cathode support 45 is metal and carries the cathodes 32; and the anode sheet 41 comprises a plurality of molybdenum anodes **41*a***, one for each cathode and each having a hole in it. What makes the common-cathode less practical than the common-anode is the necessity for bringing the individual anode leads out either through the front, where they interfere with the view or through special insulated holes in the cathode plate, which is difficult.

Another variant of the common-anode luminous screen which is not essentially different is that in which a number of cathodes, say any adjacent ten in one row, are connected together either internally or externally. It is then not possible to operate the individual concentrated arcs but only individual groups of arcs. However, where the anodes are arranged as a series of separate strips or members, individual operation for each arc becomes possible as seen in connection with Figure 8 (hereinafter described).

The extended discussion above on the circuitry auxiliary to the common-anode screen rather than on the screen itself will make clear some of the limitations of this type of screen. Consider, for example, a screen in which it is desired to obtain 500 rows and 500 columns, i. e., 250,000 individual concentrated arcs. It is clear that if 250,000 separate leads are necessary to connect to the individual cathodes, the method is not practical for all purposes although it may be practical in very large installations when the entire picture is built up from a number of sections.

Figure 8:
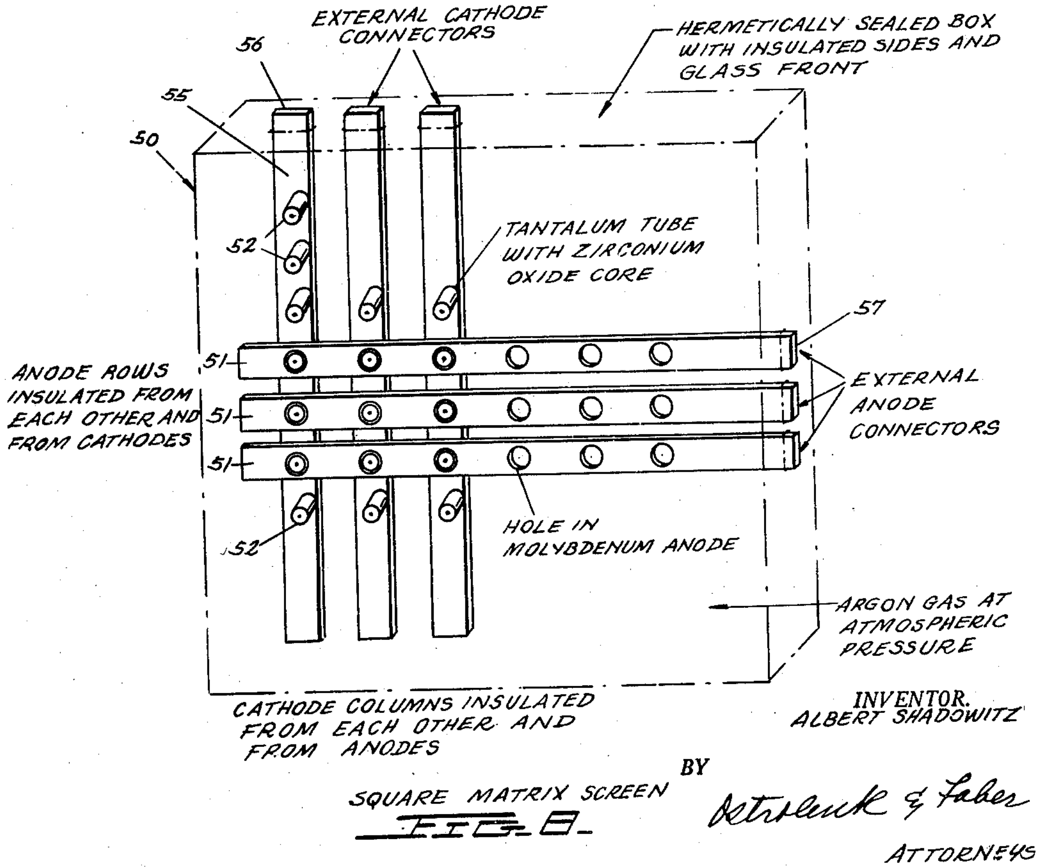
Figure 8 is a schematic perspective view of a square matrix luminous screen.

So we are led to the second of the three separate and distinct types of luminous screen under discussion in this application, the square matrix screen 50 shown in Figure 8.

In Figure 8 the anodes 51 are shown as rows and the cathodes 52 are shown as columns. By turning the diagram 90° in its plane it is seen that the anodes could just as well be the columns with the cathods as the rows. Similarly, the cathodes can be arranged in circles of various radii while the anodes can be arranged in sectors or wedges or simply along radii radiating out from the center, and vice versa. Using Figure 8 by way of example, then, it is seen that the cathodes 52 are arranged in groups or columns instead of being brought out individually as in the common-anode screen. All the cathodes in one column are connected to each other electrically by the metal support 55 holding the individual tantalum tubes. Similarly, the anodes are arranged in groups or rows instead of being brought out as one common lead as in the case of the common-anode screen. The two groups here are orthogonally disposed toward each other, but this is not necessary. It will be seen that for a screen of 250,000 individual concentrated arcs there is now a total of 1,000 external leads—500 cathode leads 56 and 500 anode leads 57. Although 1,000 leads is still a large number of leads, it is a considerably smaller number of leads than the 250,001 leads required for the common-anode screen.

By way of illustration, the individual cathodes 52 are shown as small zirconium oxide-filled tantalum tubes, the tubes in one column fitting into holes in a metal strip 55. The tubes fall directly behind the holes 54 in molybdenum strips 51 serving as anodes. The entire square array or matrix is made rigid and is supported in the hermetically sealed box as shown, the front of the box being transparent. Electrical connections to the anodes and cathodes may be made externally to the rows and columns themselves if the side walls are insulated and have hermetically sealed holes which support the metal rows and columns.

It will be appreciated that the matrix 50 need not actually be square. It may be rectangular in outline, or round or have any other shape. There may be more rows than columns or vice versa. In principle, these are just variations of the same thing.

At each and every point of the screen where a cathode column 52 passes behind an anode row 51, it is possible to produce a sharp pin prick of light by energizing that particular pair of electrodes. There is a one-to-one correspondence between the points on the screen and the cathode-anode pairs so that one, and only one, point is lit when a particular pair of electrodes is energized. If the same anode is energized but a new cathode is selected, the arc will shift to the left or to the right; if the same cathode is energized but a new anode is selected the arc will shift up or down. To be able to scan the entire screen it is now necessary to employ two commutators, one horizontal and one vertical. The extra commutator and the more complicated screen structure is the price that is paid to secure the much lower number of external leads here compared to the common-anode screen.

Figure 9:
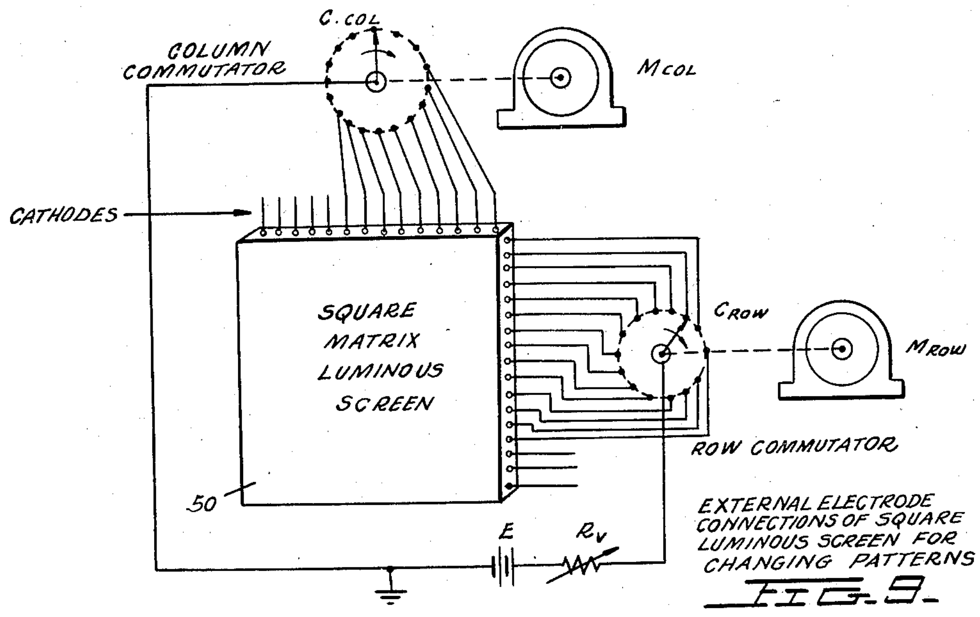
Figure 9 is a schematic circuit diagram of the external electrode connections of a square matrix luminous screen for changing patterns.

Figure 9 shows the electrical connections for this case. The column commutator $C_{Col}$ is driven by motor $M_{Col}$ and connects each of the cathode connectors in turn to the negative side of the power supply E shown at ground potential. The row commutator $C_{Row}$ is driven by motor $M_{Row}$ and connects each of the anode connectors in turn to the positive side of the power supply E. One motor $M_{Col}$ runs faster than the other motor $M_{Row}$ in such a manner that, in the time it takes the arm of $C_{Row}$ to move from one segment to the next, the arm of $C_{Col}$ completes one revolution. If there are K vertical cathodes in the screen, the column commutator turns K times as fast as the row commutator. It will be appreciated that the commutators and motors are shown as such for convenience and ease of illustration only. Any circuit that accomplishes the same end of switching a common lead in succession to a number of other leads in cyclical fashion will do as well or better, e. g., an electronic multi-position switch without any mechanically moving parts.

The series variable resistor $R_v$ is varied at a rate in synchronism with the faster of the two commutators to vary the current to, and consequently the brilliance of, each individual concentrated arc. The actual value of $R_v$ at any time is also dependent, however, on the particular position of the slower of the two commutators.

The starting of a particular concentrated arc represents here, as in the case of the concentrated arc lamp and of the common anode screen, a special problem. Either an auxiliary filament must be introduced, which ionizes the gas sufficiently so that application of the normal operating electrode voltages is sufficient to allow formation of the arc, or else a high potential difference, of the order of 1,000 volts, must be applied between the two electrodes momentarily. This is large enough to allow a spark to pass between the two electrodes; the gas is then sufficiently ionized to allow the formation of the arc. Or else the electrodes must be so shaped with sharp edges or points that a field emission discharge can occur, thereby ionizing the gas without the application of either high voltage or high temperature. Other ionizing means may be used such as ultraviolet radiation or the use of radioactive material embedded in the walls.

Once an arc is formed, the ionization does not disappear simultaneously with the removal of the applied voltage; instead, there is a de-ionization time of the order of 20 milliseconds. During this interval, if a potential difference is again applied to the electrodes the arc will form again without any special starting procedures. If the time interval between removal and reapplication of the potential is greater than the de-ionization time, it will be necessary again to apply a high voltage starting transient to re-ignite the arc unless the gas has been kept sufficiently ionized either by the other concentrated arcs in the neighborhood or by the steady application of voltage to the ionizing auxiliary filament, which may be placed near the edge of the screen.

We come now to the third of the three separate and distinct types of luminous screen, different from either the common anode screen or the square matrix screen. This is the cube matrix screen. In the common anode screen (Figure 2) a metal plate serves as one electrode for the entire multitude of concentrated arcs, the other electrode for each arc constituting a separate lead. In the square matrix screen (Figure 8) the two electrodes for each arc are brought out in groups of anodes and groups of cathodes. In the cube matrix screen the leads for the individual arcs are again brought out in groups, but there are three electrodes for each arc instead of two. While this leads to a more complicated screen structure and requires three external commutators instead of one or two, it cuts down still further on the number of external leads. A screen of 512 rows and 512 columns would require 262,144 cathode leads and 1 anode lead in the common-anode screen version—a total of 262,145 leads. The same screen would require 512 cathode leads and 512 anode leads in the square matrix version—a total of 1,024 leads. In the case of the cube matrix version there would be three sets of leads with 64 leads in each set—a total of 192 leads. By simultaneously energizing three leads, one from each set, it is possible to light any one of the 262,144 concentrated arcs in the entire array.

Figure 10:
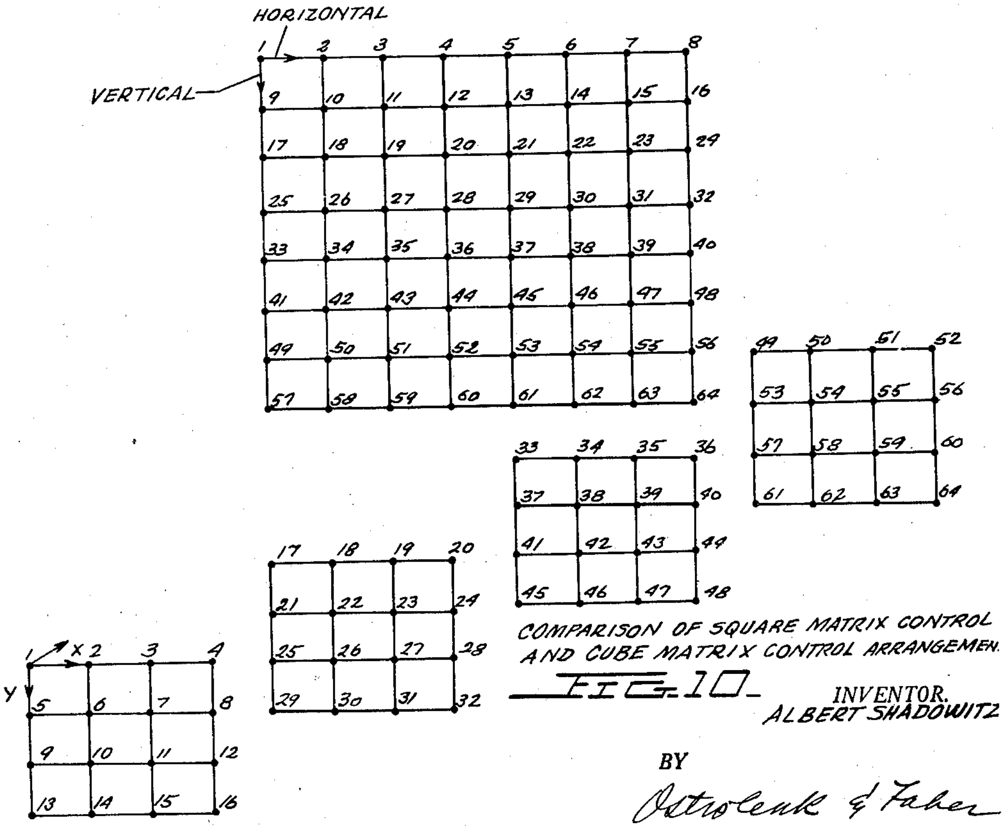
Figure 10 is a schematic comparison of a square matrix arrangement and a cube matrix arrangement.

Before describing the cube matrix screen it would be well to digress briefly. Figure 10 is a comparison of a square and a cube, each containing 64 points, the latter being shown in exploded view. We have already seen that the points in the square array may be selected by means of a horizontal and a vertical commutator. It is easily seen that the points in the cube array may also be selected with three commutators—the $x$, $y$ and $z$ commutators. In the latter case, the $x$ commutator would have four contacts. The first would be connected to points 1, 5, 9, 13, 17, 21, 25, 29, 33, 37, 41, 45, 49, 53, 57 and 61: all of the points lying in the $x=0$ plane. If the spacing between the planes is "$a$," the second contact of the $x$ commutator would be connected to all points in the $x=a$ plane, namely 2, 6, 10, 14, 18, 22, 26, 30, 34, 38, 42, 46, 50, 54, 58 and 62. Similarly, the third contact of the $x$ commutator would be connected to all points in the $x=2a$ plane and the fourth contact to all points in the $x=3a$ plane.

In the same way the $y$ commutator would have four contacts. The first would go to all points in the $y=0$ plane: 1, 2, 3, 4, 17, 18, 19, 20, 33, 34, 35, 36, 49, 50, 51, and 52. The second would go to the points in the $y=a$ plane: 5, 6, 7, 8, 21, 22, etc. Similarly for the other two contacts. The $z$ commutator likewise would have four contacts, the first going to all points in the $z=z$ plane: 1, 2, 3, 4, 5, 6, 7, 8, 9, 10, 11, 12, 13, 14, 15 and 16. The second would have 17, 18, 19, 20, 21, 22, etc. The table below summarizes the results for the first 17 points.

| Point | $x$ commutator | | | | $y$ commutator | | | | $z$ commutator | | | |
|---|---|---|---|---|---|---|---|---|---|---|---|---|
| | #1 | #2 | #3 | #4 | #1 | #2 | #3 | #4 | #1 | #2 | #3 | #4 |
| 1 | X | | | | X | | | | X | | | |
| 2 | | X | | | X | | | | X | | | |
| 3 | | | X | | X | | | | X | | | |
| 4 | | | | X | X | | | | X | | | |
| 5 | X | | | | | X | | | X | | | |
| 6 | | X | | | | X | | | X | | | |
| 7 | | | X | | | X | | | X | | | |
| 8 | | | | X | | X | | | X | | | |
| 9 | X | | | | | | X | | X | | | |
| 10 | | X | | | | | X | | X | | | |
| 11 | | | X | | | | X | | X | | | |
| 12 | | | | X | | | X | | X | | | |
| 13 | X | | | | | | | X | X | | | |
| 14 | | X | | | | | | X | X | | | |
| 15 | | | X | | | | | X | X | | | |
| 16 | | | | X | | | | X | X | | | |
| 17 | X | | | | X | | | | | X | | |

Proceeding in this fashion it is possible to cover all the points of the cube. This table now tells us which contact of which commutator the various points of the cube should be connected to in order that they may be uniquely selected by the three commutators. It is now a simple matter to re-arrange the 64 points of the cube into the 64 points of a square keeping the same connections to the three commutators.

Figure 11:
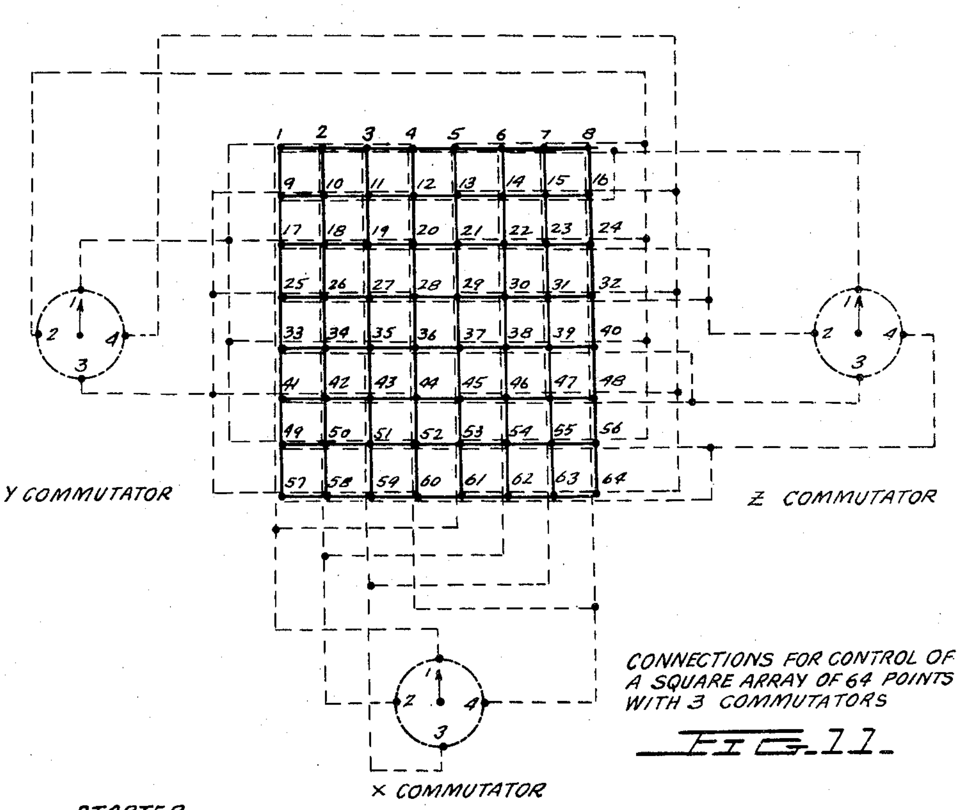
Figure 11 is a schematic diagram of the connections for control of a square array of 64 points with three commutators.

Figure 11 is a diagram of the connections for control of a square array of 64 points with 3 commutators.

If the screen is to have as many rows as it has columns, i. e., if it is a square screen, then there are only certain definite numbers permissible for the number of rows if it is to use the cube matrix control system. The table below gives the ten smallest combinations:

| # of rows= # of columns | # of contacts in each of 3 commutators | # of individual cells |
|---|---|---|
| 1 | 1 | 1 |
| 8 | 4 | 64 |
| 27 | 9 | 729 |
| 64 | 16 | 4,096 |
| 125 | 25 | 15,625 |
| 216 | 36 | 46,656 |
| 343 | 49 | 117,649 |
| 512 | 64 | 262,144 |
| 729 | 81 | 531,441 |
| 1,000 | 100 | 1,000,000 |

The screen may be made rectangular, if desired, instead of square; again, provided that certain combinations are observed. From Figure 10 we see that the $z$ commutator could have either 3 or 5 contacts instead of the original 4. This either subtracts or adds 16 points to the square; there will be either 2 rows more than the number of columns or 2 rows less than the number of columns. Generalizing, if $x$ be the number of contacts in the $x$ commutator, $y$ the number of contacts in the $y$ commutator and $z$ the number of contacts in the $z$ commutator, then $xyz$ is the total number of points in the three-dimensional box. If $r$ be the number of rows in the two-dimensional screen and $c$ the number of columns, then $rc$ is the total number of points in the screen. For this method to work we must have the same number of points in the screen and in the box: $rc=xyz$. The previous special case for $r=c$ and $x=y=z$ gave $r^2=x^3$. In the general case there are many more possibilities.

We have now completed the digression and we return to a description of the cube matrix screen. This screen is composed of a multitude of minute concentrated arcs. Here, however, each concentrated arc consists of three electrodes—an anode, a cathode and a starter. Figure 12 illustrates the nature of the three electrode concentrated arc. As its name implies, there is a third element added to the two usual elements—anode and cathode. The new element is called a starter and its function is to start the arc. I will describe two versions.

Figure 12A:
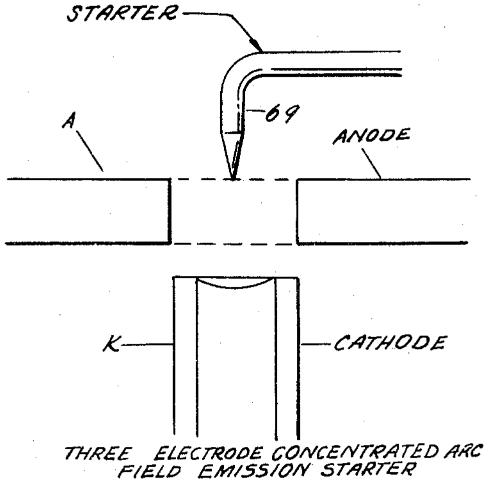
Figure 12A shows the construction of one form of a three electrode concentrated arc.

In Figures 12A the starter electrode 69 is shown as a very fine pointed wire. When a negative voltage, say 100 volts, is applied to the starter electrode the sharp point forms an intense electric field at the tip of the starter. In this manner field emission of electrons occurs, as is well known. Electrons in the starter electrode are given enough energy so they can escape from the metal. Cf. C. M. Slack and L. F. Ehrke, "Field Emission X-ray Tube," J. App. Phys., 12, 165–168 (February 1941); M. I. T., E. E. Dept., "Applied Electronics," John Wiley & Sons, 99–101 (1943)

The starter voltage is applied for only a short time, enough only to produce sufficient ionization in the region of the two main electrodes so that a discharge will start between anode and cathode. If the starter voltage is left on too long, the starter current may heat the starter to incandescence and cause the tip to vaporize.

The starter is shown as placed above the plate although it might just as well have been below. The starter wire is so thin that it blocks only a negligible portion of the hole. It is, in fact, not even necessary that it extend into the hole at all.

Figure 12B:
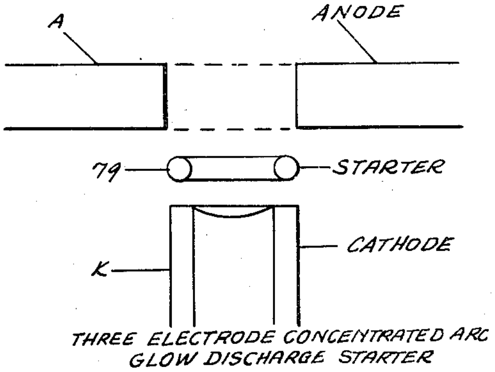
Figure 12B shows the construction of an alternate form of three electrode concentrated arc.

In Figure 12B the starter electrode 79 is in the shape of a ring, similar to the control electrode in the strobotron tube used for high speed flash work. Cf. H. E. Edgerton and K. J. Germeshausen, "A Cold Cathode Arc-Discharge Tube," E. E. 55, 790–794, 809 (1936); A. B. White, W. B. Nottingham, H. E. Edgerton and H. J. Germeshausen, "The Strobotron," I, Electronics, 10, 12–14 (February 1937), II, Electronics, 10, 18–21 (March 1937).

When a positive voltage lower than the breakdown voltage is applied to the starter, a glow discharge is formed which immediately starts the arc between cathode and anode. Here again the starter voltage is applied only momentarily.

The term "starter" has been used here to define an element which operates not only in the manner described in connection with Figures 12A and 12B; but also to include any third element in addition to the cathode and anode which assists, controls or inhibits the ignition or maintenance of the arc.

All the three-element arcs in the screen, in either case, are connected together in the same way. The *x* commutator could be used for the anodes, the *y* commutator could be used for the cathodes and the *z* commutator could be used for the starters. For a screen having 64 arcs arranged as in the square of Figure 10, we see by referring to the chart above and Figure 11 that the anodes of the arcs in the first and fifth columns are connected to each other and to one segment of the *x* commutator, the anodes of the second and sixth columns also being connected, etc.

The cathodes in the left half of rows 1, 3, 5 and 7 are connected together and go to one segment of the *y* commutator. The cathodes in the right half of these rows go to another segment, etc. For the *z* commutator, all the starters in the first two rows are connected together and to segment 1 of the commutator. Segment two goes to the starters in rows 3 and 4, etc.

The interconnections illustrated above hold for an 8 x 8 screen. For other numbers of rows and columns they would be different but they are worked out by the same principle of the correspondence between a square and a cube illustrated above.

Figure 7:
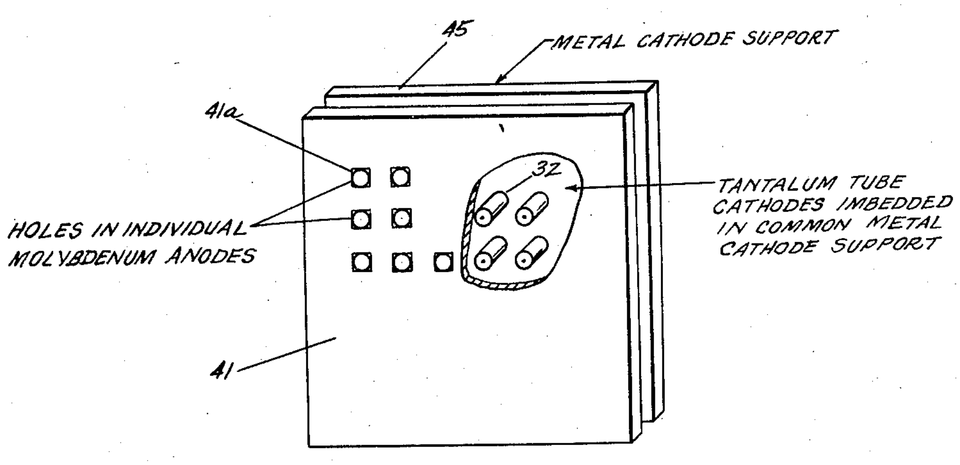
Figure 7 is a schematic perspective view, partially in section, of a common-cathode luminous screen.

While individual cathodes as in Figure 2 may be used or individual anodes as in Figure 7 may be used and while a matrix of connected anodes and cathodes as in Figure 8 may be used, other mechanical constructions may also be suggested. Thus, it may be feasible to punch holes in a tantalum bar, creating a round burr of the proper dimensions on one side of the hole and to fill the holes with zirconium oxide. It may be feasible to take many tubes and simply clamp them together in rows. Or it may be possible to make a mold and pour the proper molten metal into it. It may also be feasible to form the Figure 8 matrix as two sheets each formed of alternate strips of metal and insulation, the cathode sheet being formed of strips of tantalum and the anode sheet of strips of molybdenum. The anode sheet may have holes punched therein along the desired lines, and the cathode sheet may have holes with a burr edge punched therein. The holes of the tantalum sheet may be filled with zirconium oxide and the two sheets placed in juxtaposition with the burred edges of the cathode sheet holes directed toward the anode sheet.

Having described the nature of the self-luminous screen, I now proceed to describe the nature of a television receiving system utilizing the screen. For modern high definition television the common-anode self-luminous screen described above would require a fantastically high labor cost merely to make the connections. We shall, consequently, reserve this screen to illustrate the display system. Here I will use the square matrix screen; further below I will use the cube matrix screen for the same purpose.

Figure 13:
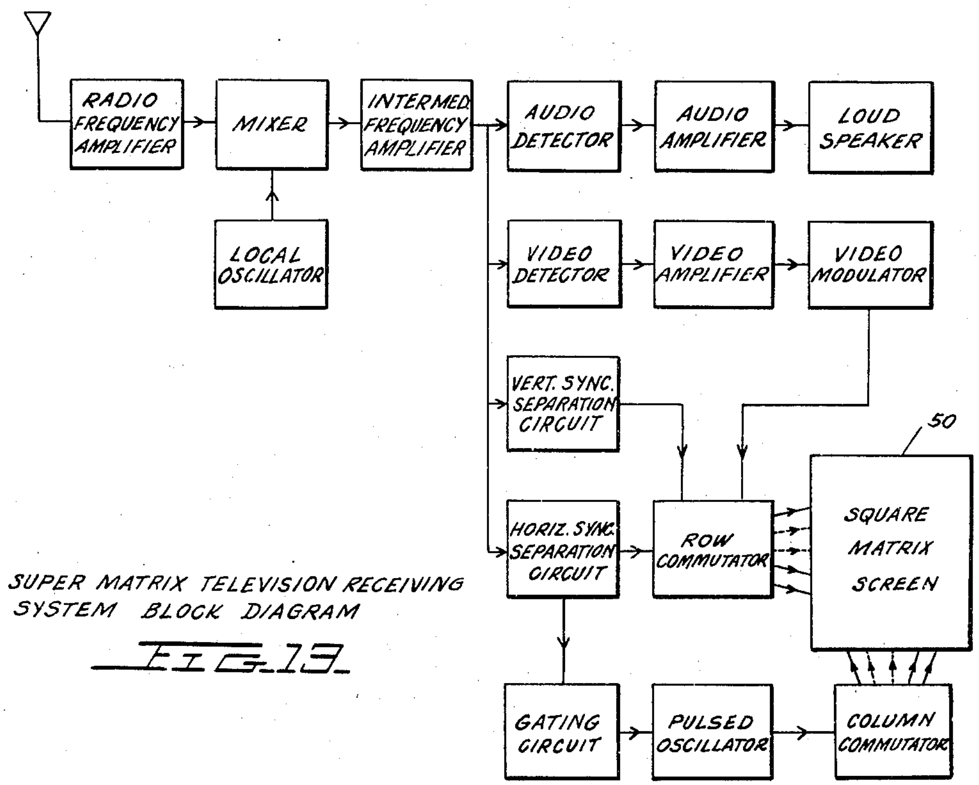
Figure 13 is a block diagram of the square matrix television receiving system.

Figure 13 is a block diagram of the new television receiving system. The television signal is received by the receiver antenna and is amplified in the usual fashion by the radio frequency amplifiers. It is then mixed with the local oscillator signal in the mixer, the result being amplified in the intermediate frequency amplifiers. At the output of the last I.-F. amplifier the composite TV signal is broken down, also in standard fashion, to form four separate components.

The first of these components is the audio signal. This is selected by the audio detector, amplified by the audio amplifier and fed to the loud speaker, where it comes out as sound. This section is standard.

The second component is the video signal. This component contains the brightness information of the picture signal at each instant. It is selected by the video detector and amplified by the video amplifier in the usual fashion. It is then fed to a video modulator instead of, as in the usual television receiver, to the grid of the cathode ray tube where it controls the beam intensity. The video modulator is essentially a vacuum tube acting as a variable resistance, the value of resistance being determined by the video signal on its grid. The video modulator can then be connected in series with the row commutator and power supply, as in Figure 9, thereby determining at each instant the current fed to the square matrix screen.

The third component is the sequence of vertical synchronizing pulses. These are selected by the vertical synchronizing pulse separation circuit in the usual fashion. The purpose of these pulses is to determine the instant when the scanning process starts a new frame. In the usual television receiver the vertical synchronizing pulses are used to trigger the vertical sweep generator. Here, however, these pulses are fed to the row commutator where they determine the instant when the commutator starts at its first segment, as shown in Figure 13.

The fourth component is the sequence of horizontal synchronizing pulses. These are selected by the horizontal synchronizing pulse separation circuit in the usual fashion. The purpose of these pulses is to determine the instant when the scanning process starts a new line. In the usual television receiver, the horizontal synchronizing pulses are used to trigger the horizontal sweep generator. Here, however, they are used for two purposes. In the first place, they are used to control the rate of commutation of the row commutator. Each time a horizontal sync pulse appears, it triggers the row commutator from one segment to the next, thereby energizing the next row of the square matrix screen since each segment of the row commutator is connected to one row of the square matrix screen. Because of interlacing, segment 1 is connected to row 1, segment 2 to row 3, segment 3 to row 5, etc., until segment 246 to row 491. Then segment 247 is connected to row 2, segment 248 to row 4, segment 249 to row 4, etc.

The second function the horizontal synchronizing pulses perform is to actuate a gating circuit. This produces a gating square pulse whose start is coincident with the horizontal sync pulse and whose finish is somewhat less than the time before the next horizontal sync pulse. This gate is used to trigger a pulsed oscillator which produces, during the gating time, a series of pulses equal in number to the number of columns in the square matrix screen. The output of the pulsed oscillator is used to determine the speed of operation of the column commutator, whose segments are individually connected to the columns of the square matrix screen. It will be seen that the column commutator must complete one cycle each time the row commutator moves but one segment; the two commutators could, therefore, be called the slow commutator and the fast commutator.

We now consider the actual number of rows and columns and the commutating speeds needed to activate them properly with the standard present-day television signals. A complete image is transmitted 30 times each second. Each image is sent using a method called interlacing—first all the odd numbered rows are sent, then all the even numbered rows—so that the picture is actually scanned from top to bottom 60 times a second but each time skipping every other line. Vertical synchronizing pulses are, therefore, sent out at intervals of 16,667 microseconds.

Not all of this available 16,667$\mu$'s is actually used for transmitting picture information. Actually, only 94% of this time or 15,320$\mu$'s, is so used—the other 6% being used for the time needed to bring the electron beams in the iconoscope and the cathode ray oscilloscope from the extreme bottom to the extreme top. The information in each picture is broken up on the basis of 525 horizontal lines. Because of this 6% allowance for fly-back time, however, there are actually only 491 active lines. The scanning process is continuous, however, regardless of whether the lines are active or inactive.

The time available from the beginning of one line to the beginning of the next is thus $\frac{1}{30}\times 525$ sec. or 63.5$\mu$'s. Again, not all of this time is used for the active scanning. Here only 83% or 52.8$\mu$'s is used for the actual scanning of the information in one line. The two losses working together amount to a loss of 22% in active area.

The highest video frequency transmitted is 4.25 mc./sec. Then $(52.8\times 10^{-6})(4.25\times 10^{6}=225$ is the total number of complete cycles of information in each line that can be transmitted. Each cycle consists of at least two parts—a positive and a negative—so there are 450 individual columns required in the screen. The number of individual rows required, as mentioned above, is 491. There are, thus, $450\times 491=220{,}950$ actual individual concentrated arcs necessary in a screen for present-day high definition television.

If the spacing between the columns is made 1.457 times the spacing between the rows, the width of the screen will then be 1.333 times its height, this being the standard aspect ratio. It might seem that the definition from row to row would then be much better than from column to column. It turns out, however, that the row-to-row definition must be multiplied by a factor of approximately 0.7 to account for the loss of definition in the scanning process caused by the finite width of the scanning line. The definitions in the two perpendicular directions then turn out to be almost equal. The number of resolvable elemental areas is then 157,500, although 220,950 arcs are required to give this. By way of comparison, a 35 mm. movie frame has about 1,000,000 picture elements; a 16 mm. movie frame has 200,000; an 8 mm. movie frame has 50,000; an 8" x 10" glossy contact print has 150,000,000.

Summing up these figures we have:

| | |
|---|---|
| Number of rows | 491 |
| Scanning speed, rows/second | 15,750 |
| Number of columns | 450 |
| Scanning speed, columns/second | 8,500,000 |
| Column spacing/row spacing | 1.457 |

It is readily seen that the fast, or column, commutator is the critical component of the proposed system. In fact, the circuitry of all the blocks in Figure 13 is conventional except for the two commutators and the square matrix screen. An explanation of the operation of the commutators is, therefore, now in order.

Two types of high speed power commutators will be described here briefly—the diode commutator and the ferrite. Both of these types have only recently been developed for use in the giant electronic computing machines and improvements in their design are being made by several firms.

Figure 14:
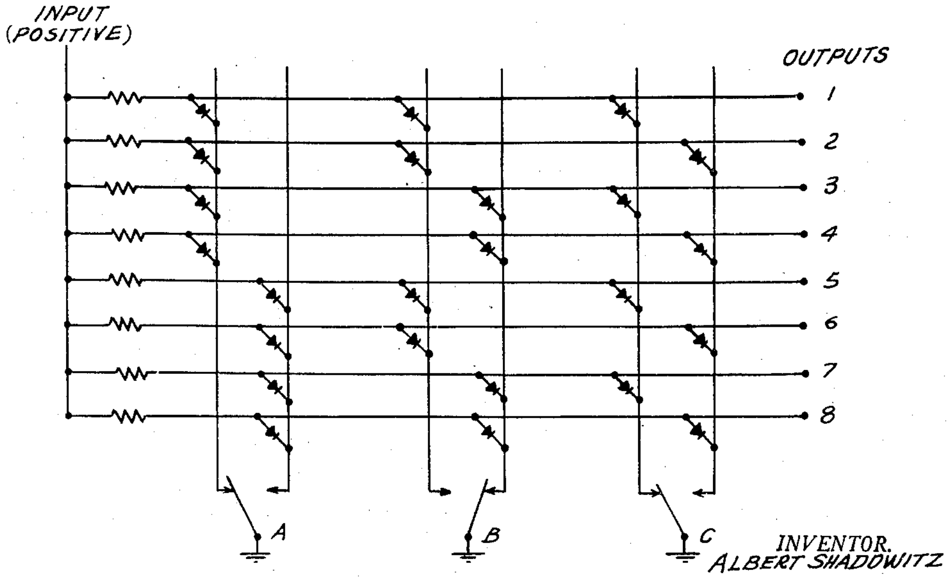
Figure 14 is a diagram of an eight position diode commutator.

Consider first the eight position diode commutator of Figure 14. Three double throw switches A, B, and C control the commutation utilizing 24 germanium crystal diodes. In general, for $2^n$ outputs there will be $n$ switches and $n(2^n)$ diodes. The table below shows the switch positions which energize a particular output, L meaning to the left and R to the right,

| Energized Output | Switch A | Switch B | Switch C |
|---|---|---|---|
| 1 | R | R | R |
| 2 | R | R | L |
| 3 | R | L | R |
| 4 | R | L | L |
| 5 | L | R | R |
| 6 | L | R | L |
| 7 | L | L | R |
| 8 | L | L | L |

when the input line contains a positive voltage, whether steady or varying. In the figure, only output 6 is connected to the input line; all the other outputs are grounded through one or the other of the diodes.

To connect the various outputs in rotation to the input it is seen from the table that it is only necessary for the three control switches to act as a binary counter. If the switches were replaced by vacuum tubes connected in standard fashion as a binary scale-of-eight, then each successive trigger pulse to the binary counter would connect the input to the next successive output. In the proposed television system it would be necessary to use a scale-of-512 with 9 control switches for each of the two commutators, one being triggered by the horizontal synchronizing pulses and the other by the pulsed oscillator. Various modifications of the basic circuit above are in present-day use which are much more economical of diodes, cutting their number by approximately a factor of ten. Cf. "Rectifier Networks for Multiposition Switching," Brown et al., Proc. I. R. E., 37, 139–147 (February 1949). Furthermore, techniques of assembly have already been developed which permit 128 diodes to be packaged per cubic inch, cf. "Welded Joints on Diodes Reduce Computer Bulk," S. G. Lutz, Electronics (November 1954). It should be mentioned here that when the row commutator counts to 491, it stops counting. It starts from 1 again when triggered by a vertical synchronizing pulse. Otherwise the need for counting to 525 lines would require a scale-of-1024. In the column commutator the pulsed oscillator is gated off after 450 cycles, so the commutator stops counting until the oscillator is gated on again.

Figure 15B:
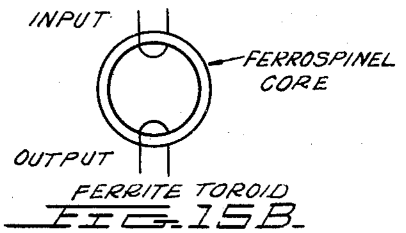
Figure 15B shows schematically a ferrite toroid for the commutator of Figure 15A.
Figure 15C:
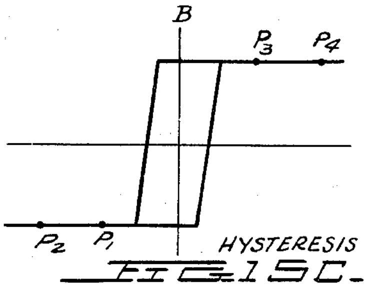
Figure 15C is the hysteresis curve for the core of the toroid of Figure 15B.

The second type of high speed power commutator that has already been developed by others is the ferrite type. Cf. "Static Magnetic Matrix Memory and Switching Circuits," J. A. Rajchman, RCA Rev., 13, 183–201 (June 1952); "A Myriabit Magnetic Core Matrix Memory," J. A. Rajchman, Proc. I. R. E., 41, 1407–1421 (October 1953). To understand the ferrite commutator I consider first the toroid coil of Figure 15B. This consists of two coils wound on a material, called a ferrospinel, which is in the ferrite class. Cf. "Ferrite Characteristics at Radio Frequencies," R. L. Harvey, Tele-Tech & Electronic Industries (June 1954), 110–112, 186, 188, 387–390. The core possesses a hysteresis curve that is almost rectangular. Let the operating point be $P_1$ in the curve of Figure 15C. If a pulse is sent into the input winding of such polarity as to drive the magnetizing force H further to the left, to $P_2$ say, there will be a negligible change in the flux density B; the output winding will not have any voltage induced in it. If the pulse, however, is of such polarity as to drive H sufficiently far to the right, to $P_3$ say, there will be a large change in B and the output coil will have a large voltage induced in it.

Similarly, going from $P_3$ to $P_4$ gives no output but going from $P_3$ to $P_1$ gives a large output. Essentially, there are two steady state conditions, positive and negative. In the positive state only a negative input pulse will produce any output, the core transforming to the negative state. In the negative state, only a positive input pulse will produce any output, the core transforming to the positive state.

Figure 15A:
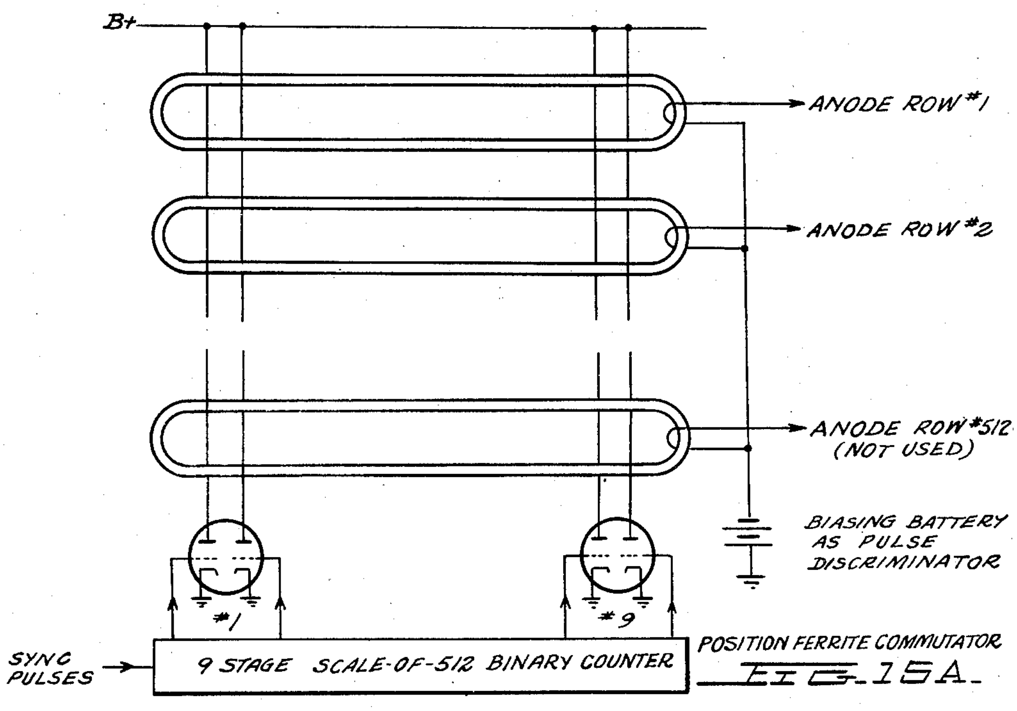
Figure 15A is a diagram of a 512 position ferrite commutator.

Now consider a collection of such cores as shown in Figure 15A. For a screen matrix having 491 rows it will be necessary to use $2^9=512$ cores in the row commutator, each core having an output winding going to a separate row (21 cores are wasted by the dead-time). Each core also has 9 pairs of input coils wound in either one of two directions, the two coils for any one input channel being wound in opposite directions. The coil nected to the $x$ commutator. Otherwise the arc may be restruck by the starter. Thus, in the case of the field emission starter the starter acts in conjunction with the anode; the arc would not be restruck for arrangement 3; anode-$x$, cathode-$y$, starter-$z$, or for arrangement 4: anode-$x$; cathode-$z$, starter-$y$. On the other hand, for the glow discharge starter the starter acts in conjunction with the cathode. Here the arc would not be restruck for the last two possibilities: (5) Anode-$y$, cathode-$x$, starter-$z$ and (6) anode-$z$, cathode-$x$, starter-$y$.

| | 1 | | 2 | | 3 | | 4 | | 5 | | 6 | |
|---|---|---|---|---|---|---|---|---|---|---|---|---|
| Commutator Element Connections: Fast / Medium / Slow | S A C | | S C A | | A C S | | A S C | | C A S | | C S A | |
| Starter Polarity | Pos. | Neg. | Pos. | Neg. | Pos. | Neg. | Pos. | Neg. | Pos. | Neg. | Pos. | Neg. |
| Elements Controlling Arc Energization | S, C | S, A | S, C | S, A | S, C | S, A | S, C | S, A | S, C | S, A | S, C | S, A. |
| Element Controlling Arc De-Energization | A | A | C | C | A | A | A | A | C | C | C | C. |
| Starter Arc Restrike Possibility | No | No | No | No | Yes | No | Yes | No | No | Yes | No | Yes. |
| Arc Duration | Long | Long | Long | Long | Short | Short | Short | Short | Short | Short | Short | Short. |

A: anode, C: cathode, S: starter.

directions are then made in binary fashion: the first input channel would have the same direction for output channels 1–256 and the opposite for 257–512; the second input channel would have the same direction for output channels 1–128, the opposite for 129–256, the original for 257–384 and the opposite again for 385–512, etc., so that the ninth input channel would have the direction of the winding change for each successive output channel.

Assume now that all the cores are initially in their negative state. Let one of each pair of input coils be energized by a pulse, say 1$a$, 2$a$, 3$a$ and 4$a$, etc., then only output channel 1 will have a pulse of amplitude $+4$, the others having either 2, 0, $-2$ or $-4$. A discriminator at the output will now select only channel 1. Similarly, other combinations of the energized inputs uniquely select one output. It is seen that, just as for the diode commutator, the code at the input channels needed for a one-to-one correspondence with the output channels is nothing else but the binary code.

It should be mentioned that the cores used are as small as 1/16″ in outside diameter with 1 input circuit. With 9 input circuits they will be about 3/4″ in one direction but still only 1/16″ in the other. Matrices with 1,000 cores have been made in a space less than 1 foot square for the MIT Whirlwind I digital computer. The number of tubes used per commutator is 18 (9 in the binary counter and 9 buffer switches).

Using the cube matrix screen the proposed television receiving system would utilize three commutators, as mentioned above, fast, medium and slow. The manner of connection of these commutators to the three individual arc elements: anode, cathode and starter, offer a number of interesting possibilities. There are a total of six possible arrangements. Of these, the two in which the starter is connected to the fast commutator, namely: (1) Starter—Fast or $x$ Commutator, Anode-Medium or $y$ Commutator, Cathode-Slow or $z$ Commutator, and (2) Starter-$x$, Cathode-$y$, Anode-$z$ offer the possibility of greater light output (at the cost of greater power supply drain). This is so because once the starter ignites an arc and the arc transfers between the main electrodes, the light does not extinguish itself when the starter proceeds to another concentrated arc but only when either the cathode or anode voltage is switched off. Therefore, using either of these connections it is possible to start the arcs individually but to maintain a number of them simultaneously, the exact number depending on the choice of commutating rates.

In the case of the other four possibilities the $x$ commutator is connected to either the anodes or the cathodes. Extinction is fast, exceeding the time of commutation only by the time of deionization, if the element acting to start the arc (in conjunction with the starter) is con- The actual connection of the cube matrix screen to the three commutators is most easily done as follows. There are 491 active rows and 450 active columns. Suppose we add enough inactive rows at the bottom to make the total 512; similarly we add enough inactive columns at the right to make the total 512. We now make the correspondence to a 64 x 64 x 64 unit cube as shown previously.

Figure 16:
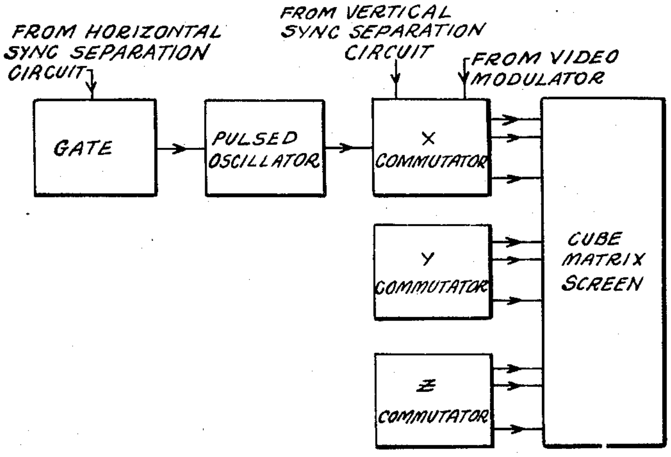
Figure 16 is a partial block diagram of the cube matrix television system.

The fast ($x$) commutator goes at a rate of 8,500,000 segments per second and has 64 segments. This rate is determined by the pulsed oscillator shown in Figure 16 which is a partial block diagram of the cube matrix television system. The rest of the system is the same as in Figure 13.

The medium ($y$) commutator goes at a rate of $$\frac{8{,}500{,}000}{64}=132{,}812.5$$

segments per second. This rate can most conveniently be obtained from the $x$ commutator. Each time the $x$ commutator completes one cycle it triggers the $y$ commutator to its next segment. The $y$ commutator has 64 segments.

The slow ($z$) commutator goes at a rate of $$\frac{132{,}812.5}{64}=2{,}075.2$$

segments per second approximately. This rate may similarly be obtained most conveniently from the $y$ commutator. Each time the $y$ commutator completes one cycle it triggers the $z$ commutator to its next segment. The $z$ commutator also has 64 segments.

Returning to Figure 16, the pulsed oscillator goes at a rate of 8.5 mc./sec., as mentioned above. The gate is so set that the oscillator is only energized for 512 cycles; it is then de-energized for a time corresponding to 13 cycles. After this the next horizontal synchronizing pulse reopens the gate and the cycle repeats.

It is very convenient in this system to decrease the number of columns in the screen from 450 to 448, a change which could scarcely be noticed by an observer. If this is done then the $y$-commutator need not have any connections to the screen for segments 8, 16, 24, 32, 40, 48, 56 and 64, and the $z$-commutator need not have any connections to the screen for segments 32 and 64. This automatically eliminates all connections to the screen for the geographic regions where the picture information is suppressed to allow fly-back dead time. To see this clearly we observe the following. The first cycle of the $x$-commutator, corresponding to the first segment of the $y$-commutator, takes in 64 points. On the screen this corresponds to the first seventh of the top line. The second cycle of the $x$-commutator, or the second segment of the y-commutator, takes in the second seventh of the top line, etc., so that at the end of the seventh cycle 448 points in the top row of the screen have been covered. The eighth segment of the y-commutator would cover points 449 through 512, but these are not seen since there are no such points in the screen and no connections to them.

The ninth segment of the y-commutator starts row 3 of the screen (row 2 is skipped because of interlacing) and the 15th segment completes row 3. Again, the 16th cycle goes unreproduced. Similarly, it is seen why segments 24, 32, 48, 56 and 64 of the y commutator need no connections. At the end of the 64th segment the first eight odd rows have been completed on the screen. To start the ninth odd row, the z-commutator moves over to its second segment and the x and y commutators start over again at their first segment. Here the same x cycle repeats over again, just as at the beginning of row 1. When the z-commutator gets to segment 31 the rows that are swept out on the screen are 481, 483, 485, 487, 489 and 491. However, by standard means not shown when the mid-point is reached on line 491 the z commutator switches to segment 32 which is unconnected. The next vertical synchronizing pulse then arrives after a time corresponding to the sweeping of eight lines, the dead time, and segments 33 of commutator z is then connected to rows 2, 4, 6, 8, 10, 12, 14 and 16 at the top of the screen. The process continues until segment 63 completes rows 488. Segment 64, unconnected, then gives the proper dead time to start the entire sequence over again.

It will be seen that the horizontal fly-back dead time is obtained from the gate which suppresses the 4.5 mc. pulsed oscillator after the 448th pulse, while the vertical fly-back dead time is obtained from the unconnected segments of the z-commutator.

In my consideration of various types of television systems using a self-luminous screen I come finally to color television. The present methods of obtaining color images make use of a phosphor screen in the cathode ray tube which consists of three different phosphors arranged in a definite pattern of many fine, small spots. The cathode ray beam is directed from one spot to another in a set fashion, each spot producing a bust of light of a given color. There are three colors—red, green and blue—corresponding to the three separate phosphors and by means of them any colored picture may be reproduced. The cost of making such a screen is high because of the great care that must be used in obtaining the high definition required. Furthermore, the electron beam must be directed to the proper point with great precision for, otherwise, the beam may hit a green spot instead of a blue or red one, giving unpleasant optical effects.

The method proposed here is to modify the self-luminous screen so that the individual concentrated arcs give off light of a characteristic color and then to arrange these colored arcs in the screen according to the same pattern as now used in color cathode ray tubes. The excitation of the individual bursts of light is no longer done by an electron beam but is arranged by the proper connections from the commutators to the screen. The circuitry of the television receiver would be the same as that for a standard color television receiver using the standard color television signals, again except for the sweep circuits. The latter would be similar to the commutator circuits outlined above. There would thus be no question of proper color registration since, once the proper external electrical connections have been made, there is no possibility of exciting the wrong color at any particular point.

The individual concentrated arcs can be modified to give off colored light in two ways. First, I mix with the zirconium oxide that is packed into the tantalum cathodes the standard chemicals that have been used for many years to impart special colors to the carbon arc or to pyrotechnic displays. These chemicals, primarily the elements of the first two columns of the periodic chart of the elements or their compounds, are commonly used to produce such colors because their spectra have intense lines of monochromatic colors. A special problem presents itself in their use here: the melting and boiling points of these elements is far below the 3000° K. operating temperature of the concentrated arc. Thus, the color imparting elements would tend to boil out of the tantalum tubes. However, just as the evaporation of the zirconium itself is kept at a low value by the ionization of the escaped atoms and their consequent reattraction by the cathode, so also the additive color compound atoms and molecules that boil out would be heavily ionized and attracted back again. By closing off the rear of the tubes evaporation from that end can be eliminated.

The color producing elements would still evaporate faster than the zirconium, their boiling points being so much lower. The life of a particular arc is normally limited by the 1,000 hours or so required for the part of the zirconium oxide nearest the anode to evaporate; starting then becomes difficult and the zirconium oxide left in the majority of the tube is of no use. Here, however, the faster evaporation of the color producing compounds is made up for by the extra supply available in the middle and rear end of the tantalum tube.

A drawback of this method is that the bright optical lines that are emitted are super-imposed on the continuous spectrum of the incandescent zirconium. Thus, individual pure colors cannot be obtained. The zirconium could be eliminated altogether to obtain a pure color; but then the extremely high operating temperature with its resultant high light emission cannot be obtained.

It is clear that in this method three distinct kinds of tantalum cathodes would have to be prepared and then assembled in the proper sequence.

The second method of obtaining colored spots of light eliminates these difficulties. This is simply to cover the hole in the anode of each individual arc with an optical filter. To obtain red I could, for example, use a piece of red-colored glass over the hole, or even in it. Or I could take a flat sheet of glass, on one surface of which a pattern of colored spots has been deposited in the proper fashion by standard techniques and press this against and in front of the matrix. It could then serve as the front of the screen itself, the colored surface being inside. Then one concentrated arc will be viewed through a red filter, another through a green filter, a third through a blue, etc. About two-thirds of the light produced would be lost by absorption in the filters, but there would be no white continuum in the background.

The problem of color registration by this method would enter in the assembly of the filter and the matrix but, once assembled, not in the operation. A given arc would only give off light seen as a definite color. All the cathode tantalum tubes in this method are identical.

We finally come to the use of the self-luminous screen as a large audience display. Here it is necessary to use commutators whose number is determined by the type of screen as outlined above and a modulator; all the other circuitry of the television system is unnecessary. The number of individual arcs may, for many applications, be considerably reduced. Any means of operating the commutators and modulator in synchronism may then be used.

In the foregoing the invention has been described solely in connection with specific illustrative embodiments thereof. Since many variations and modifications of the invention will now be obvious to those skilled in the art, I prefer to be bound not by the specific disclosures herein contained but only by the appended claims.

I claim:

1. A picture screen comprising a plurality of individual local light sources; each of said local light sources comprising a high intensity pin-point electric arc unit including a cathode and an anode; each light source being located at a position with respect to the other light sources to correspond to an elemental segment of a picture area; each electric arc unit comprising a cathode of tantalum and zirconium oxide and an anode of molybdenum; said cathode and anode being placed in an inert atmosphere, said arc units being formed by the intersections of a plurality of conductive parallel members extending in one direction and carrying a plurality of aligned cathodes and a plurality of parallel molybdenum strips extending across and at an angle to said aligned cathodes, each of the molybdenum strips carrying an anode common to a respective cathode, each of said molybdenum strips having a plurality of openings each in registry with one of said cathodes.

2. A picture screen comprising a plurality of individual local light sources; each of said local light sources comprising a high intensity pin-point electric arc unit including a cathode and an anode; each light source being located at a position with respect to the other light sources to correspond to an elemental segment of a picture area; each electric arc unit comprising a cathode of tantalum and zirconium oxide and an anode of molybdenum; said cathode and anode being placed in an inert atmosphere, said arc units being formed by the intersections of a plurality of conductive parallel members extending in one direction and carrying a plurality of aligned cathodes and a plurality of parallel molybdenum strips extending across and at an angle to said aligned cathodes, each of the molybdenum strips carrying an anode common to a respective cathode, each of said molybdenum strips having a plurality of openings each in registry with one of said cathodes, said conductive members, cathodes and anodes being enclosed in a common housing which includes said inert atmosphere; means for controlling the individual energization of said light sources; and means for controlling the individual intensity of energization of said light sources; and a selector for sequentially connecting said individual light sources to each of said means.

3. A picture screen comprising a plurality of individual local light sources; each of said local light sources comprising a high intensity pin-point electric arc unit including a cathode and an anode; each light source being located at a position with respect to the other light sources to correspond to an elemental segment of a picture area; each electric arc unit comprising a cathode of tantalum and zirconium oxide and an anode of molybdenum; said cathode and anode being placed in an inert atmosphere; means for controlling the individual energization of said light sources; and means for controlling the individual intensity of energization of said light sources; and a selector for sequentially connecting said individual light sources to each of said means; said molybdenum anode comprising a sheet having a plurality of openings each in registry with a single cathode; the individual cathodes being aligned with the openings, electrically insulated from each other and individually connected to said means for controlling the energization of said light sources and the means for controlling the intensity of energization of said light sources.

4. A self-luminous display system comprising a plurality of individual local light sources; each of said local light sources comprising a high intensity pin-point electric arc unit including a cathode and an anode; each light source being located at a position with respect to the other light sources to correspond to an elemental segment of a picture area; said cathode and anode being placed in an inert atmosphere; said arc units comprising a plurality of conductive parallel members extending in one direction; each of said conductive members carrying a plurality of aligned cathodes, and a plurality of anode strips extending across and in front of the cathodes; each of the anode strips comprising an anode common to a plurality of cathodes on separate conductive members; each of the cathode strips having a plurality of openings each in registry with a cathode; means for controlling the individual energization of said light sources; and means for controlling the individual intensity of energization of said light sources; and a selecto: for sequentially connecting said individual light sources to each of said means.

5. A self-luminous display system comprising a plurality of individual local light sources each corresponding to elemental segments of a picture area; each of said local light sources consisting of an anode, a cathode and a starter; groups of commonly connected anodes, groups of commonly connected cathodes and groups of commonly connected starters being arranged in a substantially planar development of a cube matrix wherein simultaneous energization of a selected anode group, a selected cathode group and a selected starter group will result in energization of one light source, means for controlling the energization of selected groups comprising a circuit selecting member for sequentially selecting the groups of anodes, a circuit selecting member for sequentially selecting the groups of cathodes, a circuit selecting member for sequentially selecting the groups of starters to cause light sources to be energized successively along predetermined paths.

6. A self-luminous display system comprising a plurality of individual local light sources each corresponding to elemental segments of a picture area; each of said local light sources consisting of an anode, a cathode and a starter; groups of commonly connected anodes, groups of commonly connected cathodes and groups of commonly connected starters being arranged in a substantially planar development of a cube matrix wherein simultaneous energization of a selected anode group, a selected cathode group and a selected starter group will result in energization of one light source, means for controlling the energization of selected groups comprising a circuit selecting member for sequentially selecting the groups of anodes, a circuit selecting member for sequentially selecting the groups of cathodes, a circuit selecting member for sequentially selecting the groups of starters to cause light sources to be energized successively along predetermined paths; the circuit selecting members for the anode, cathode and starter groups operating in sequence; with a second circuit selecting member being operated one step in response to completion of a cycle of a first circuit selecting member; and a third circuit selecting member being operated one step in response to completion of a cycle of the second circuit selecting member.

7. A picture screen comprising a sealed housing having a back plate; a light transmitting front plate spaced from the back plate; an inert gas in said sealed housing; a plurality of individual local light sources in said housing; each of said local light sources comprising a high intensity pin-point electric arc unit including a cathode and an anode; each light source being located at a position with respect to the other light sources to correspond to an elemental segment of a picture area; each electric arc unit comprising a cathode of tantalum and zirconium oxide and an anode of molybdenum; said cathode and anode being placed in an inert atmosphere; said arc units comprising a plurality of conductive parallel members extending in one direction; each of said conductive members carrying a plurality of aligned cathodes; and a plurality of parallel molybdenum strips extending across and in front of the cathodes; each of the molybdenum strips comprising an anode common to a plurality of cathodes on separate conductive members; each of the molybdenum strips having a plurality of openings each in registry with a cathode; means for controlling the individual energization of said light sources; and means for controlling the individual intensity of energization of said light sources; and a selector for sequentially connecting said individual light sources to each of said means.

8. A picture screen comprising a sealed housing having a back plate; a light transmitting front plate spaced from the back plate; an inert gas in said sealed housing; a plurality of individual local light sources in said housing; each of said local light sources comprising a high intensity pin-point electric arc unit including a cathode and an anode; each light source being located at a position with respect to the other light sources to correspond to an elemental segment of a picture area; means for controlling the individual energization of said light sources; and means for controlling the individual intensity of energization of said light sources; and a selector for sequentially connecting said individual light sources to each of said means, and color filtering means in front of said local light sources including individual color areas for each light source.

9. A self-luminous display system comprising a plurality of individual local light sources each corresponding to elemental segments of a picture area; each of said local light sources consisting of an anode, a cathode and a starter; groups of commonly connected anodes, groups of commonly connected cathodes and groups of commonly connected starters being arranged in a substantially planar development of a cube matrix wherein simultaneous energization of a selected anode group, a selected cathode group and a selected starter group will result in energization of one light source, means for controlling the energization of selected groups comprising a circuit selecting member for sequentially selecting the groups of anodes, a circuit selecting member for sequentially selecting the groups of cathodes, a circuit selecting member for sequentially selecting the groups of starters to cause light sources to be energized successively along predetermined paths; the circuit selecting members for the anode, cathode and starter groups operating in sequence; with a second circuit selecting member being operated one step in response to completion of a cycle of a first circuit selecting member; and a third circuit selecting member being operated one step in response to completion of a cycle of the second circuit selecting member; the second circuit connecting member being connected to energize the starter groups.

10. A self-luminous display system comprising a plurality of individual local light sources each corresponding to elemental segments of a picture area; each of said local light sources consisting of an anode, a cathode and a starter; groups of commonly connected anodes, groups of commonly connected cathodes and groups of commonly connected starters being arranged in a substantially planar development of a cube matrix wherein simultaneous energization of a selected anode group, a selected cathode group and a selected starter group will result in energization of one light source, means for controlling the energization of selected groups comprising a circuit selecting member for sequentially selecting the groups of anodes, a circuit selecting member for sequentially selecting the groups of cathodes, a circuit selecting member for sequentially selecting the groups of starters to cause light sources to be energized successively along predetermined paths; the circuit selecting members for the anode, cathode and starter groups operating in sequence; with a second circuit selecting member being operated one step in response to completion of a cycle of a first circuit selecting member; and a third circuit selecting member being operated one step in response to completion of a cycle of the second circuit selecting member; said circuit connecting members being included in a binary counter circuit.

11. A luminous display member comprising a plurality of individual local light sources; each of said local light sources comprising a high intensity pin-point electric arc unit including a cathode and an anode; each light source being located at a position with respect to the other light sources to correspond to an elemental segment of a picture area; said arc units comprising a first set of radially extending conductive members and a second set of arcuately extending conductive members; one set being placed in front of the other set; the conductive members of the set in front forming a plurality of continuous anodes, each member of the set having a plurality of openings, each opening being located at a point where said member traverses a conductive member of the other set; the members of the other set each having a plurality of cathode members with each cathode in registry with an opening of a member of the first set.

12. A picture screen comprising a sealed housing having a back plate; a light transmitting front plate spaced from the back plate; an inert gas in sealed housing; a plurality of individual local light sources in said housing; each of said local light sources comprising a high intensity pin-point electric arc unit including a cathode and an anode; each light source being located at a position with respect to the other light sources to correspond to an elemental segment of a picture area; means for controlling the individual energization of said light sources; and means for controlling the individual intensity of energization of said light sources; and a selector for sequentially connecting said individual light sources to each of said means, and color filtering means in front of said local light sources including individual color areas for each light source; said color areas being carried on the light transmitting front plate.

References Cited in the file of this patent

UNITED STATES PATENTS

| | | |
|---|---|---|
| 1,754,491 | Wald | Apr. 15, 1930 |
| 1,779,748 | Nicholson | Oct. 28, 1930 |
| 1,810,692 | Wald | June 16, 1931 |
| 2,021,010 | Jenkins | Nov. 13, 1935 |
| 2,049,763 | De Forest | Aug. 4, 1936 |
| 2,136,441 | Karolus | Nov. 15, 1938 |
| 2,453,118 | Buckingham et al. | Nov. 9, 1948 |
| 2,543,793 | Mauks | Mar. 6, 1951 |